US011251884B2

(12) United States Patent
Chisu et al.

(10) Patent No.: US 11,251,884 B2
(45) Date of Patent: Feb. 15, 2022

(54) PROCESS BASED ANTENNA CONFIGURATION

(71) Applicant: Motorola Mobility LLC, Chicago, IL (US)

(72) Inventors: Daniel C. Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/161,241

(22) Filed: Jan. 28, 2021

(65) Prior Publication Data

US 2021/0258087 A1 Aug. 19, 2021

Related U.S. Application Data

(62) Division of application No. 16/792,739, filed on Feb. 17, 2020.

(51) Int. Cl.
*H04B 17/21* (2015.01)
*H04B 17/318* (2015.01)
(Continued)

(52) U.S. Cl.
CPC ............. *H04B 17/21* (2015.01); *H01Q 1/243* (2013.01); *H01Q 3/247* (2013.01); *H01Q 21/28* (2013.01); *H04B 7/0808* (2013.01); *H04B 7/0814* (2013.01); *H04B 7/0888* (2013.01); *H04B 17/318* (2015.01); *H04W 12/72* (2021.01); *H04W 16/28* (2013.01)

(58) Field of Classification Search
CPC ...................................................... H04B 17/21
See application file for complete search history.

(56) References Cited

U.S. PATENT DOCUMENTS 6,392,610 B1 * 5/2002 Braun ...................... H01Q 9/26
343/876
6,862,433 B2 3/2005 Callaway
(Continued)

OTHER PUBLICATIONS

"Notice of Allowance", U.S. Appl. No. 16/792,739, dated Dec. 10, 2020, 8 pages.
(Continued)

*Primary Examiner* — Hsinchun Liao
(74) *Attorney, Agent, or Firm* — FIG. 1 Patents

(57) ABSTRACT

Techniques for process based antenna configuration are described, and may be implemented via a wireless device to identify different usage scenarios and to adapt antenna configurations to optimize wireless performance based on the scenarios. For instance, the described techniques enable a wireless device to be calibrated for wireless communication by identifying different obstruction states of a wireless device that correspond to ways that the wireless device is held (e.g., grasped) by a user in different scenarios. The obstruction states are then correlated to antenna positions in the wireless device to prioritize (e.g., activate) antennas that are relatively unobstructed, such as by activating unobstructed antennas and/or deactivating obstructed antennas. Further, calibration can take into specific processes (e.g., applications) and specific users to calibrate an optimize wireless performance based on ways in which a user typically interacts with a process.

20 Claims, 14 Drawing Sheets

(51) Int. Cl.
*H04B 7/08* (2006.01)
*H01Q 21/28* (2006.01)
*H04W 16/28* (2009.01)
*H01Q 3/24* (2006.01)
*H01Q 1/24* (2006.01)
*H04W 12/72* (2021.01)

(56) References Cited

U.S. PATENT DOCUMENTS

| | | | |
|---|---|---|---|
| 7,321,580 B1 * | 1/2008 | Ramanathan | H04W 74/0816 |
| | | | 370/252 |
| 10,951,331 B1 | 3/2021 | Chisu et al. | |
| 2004/0002340 A1 | 1/2004 | Lim et al. | |
| 2008/0032756 A1 | 2/2008 | Kanazawa | |
| 2008/0182537 A1 | 7/2008 | Manku et al. | |
| 2011/0202866 A1 | 8/2011 | Huang et al. | |
| 2013/0051261 A1 * | 2/2013 | Kazmi | H04W 52/0277 |
| | | | 370/252 |
| 2019/0123433 A1 * | 4/2019 | Lee | H01Q 1/3233 |

OTHER PUBLICATIONS

"Restriction Requirement", U.S. Appl. No. 16/792,739, dated Oct. 19, 2020, 5 pages.

* cited by examiner

900

PROCESS BASED ANTENNA CONFIGURATION

RELATED APPLICATION

This application is a divisional of and claims priority to U.S. patent application Ser. No. 16/792,739, filed 17 Feb. 2020 and titled "Process Based Antenna Configuration," the disclosure of which is hereby incorporated by reference in its entirety herein.

BACKGROUND

Wireless communication is ubiquitous and is used for a multitude of purposes, including wireless voice and data communication. Further, wireless protocols are constantly evolving to provide increased service levels for wireless users. For instance, recent developments in wireless technology have greatly increased the rate at which information can be transmitted wirelessly. One example of such a development is the 5G wireless cellular technology (e.g., 5G New Radio (NR)), which typically achieves higher data rates than previous wireless technologies. Such recently developed technologies achieve increased data rates at least in part by utilizing higher frequency wireless spectrum than previous technologies, such as 3.5 gigahertz (GHz) and higher. In fact, some implementations of these wireless technologies use extremely high frequency (EHF) frequencies, such as millimeter wave (mmWave) frequencies. While higher data rates can be achieved, such technologies exhibit a number of implementation challenges, such as increased directionality. Further, higher frequency wireless technologies can experience higher susceptibility to signal obstruction caused by physical interference, such as due to interference caused by a user grasping a device.

BRIEF DESCRIPTION OF THE DRAWINGS

Aspects of process based antenna configuration are described with reference to the following Figures. The same numbers may be used throughout to reference similar features and components that are shown in the Figures.

DETAILED DESCRIPTION

Figure 1:
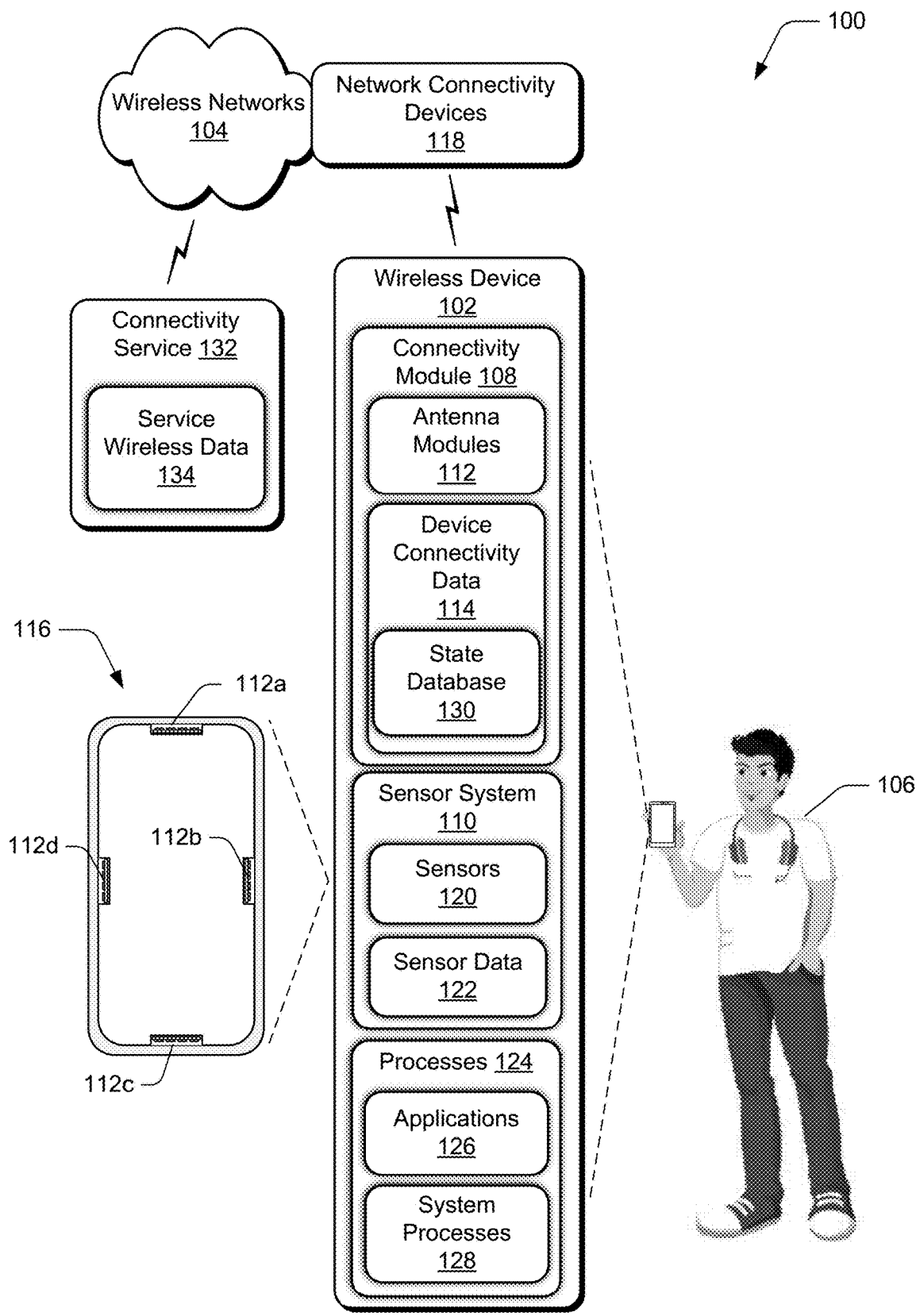
FIG. 1 illustrates an example environment in which aspects of process based antenna configuration can be implemented.

Techniques for process based antenna configuration are described, and may be implemented via a wireless device to identify different usage scenarios and to adapt antenna configurations to optimize wireless performance based on the scenarios. Generally, the described techniques enable the wireless device to be calibrated for wireless communication by identifying different obstruction states of a wireless device that correspond to how portions of a wireless device are obstructed based on different usage scenarios. Obstruction states, for instance, represent ways that a wireless device is held (e.g., grasped) by a user in different scenarios. The obstruction states are then correlated to antenna positions in the wireless device to prioritize (e.g., activate) antennas that are relatively unobstructed, such as by activating unobstructed antennas and/or deactivating obstructed antennas. Further, calibration can take into accounts specific processes (e.g., applications) and specific users to calibrate an optimize wireless performance based on ways in which a user typically interacts with a process.

Consider, for example, a scenario where a user launches an application on a wireless device and holds the wireless device is a particular way while interacting with the application. For instance, some applications may provide a preferable user experience in a portrait orientation of a wireless device (e.g., an email application), whereas other applications are more suited to a landscape orientation, e.g., a video player application. Thus, depending on application context and user preferences, a user may grasp a device in different ways to achieve a desired viewing and/or interaction perspective. Accordingly, techniques described herein enable device calibration to adapt antenna performance to these different interaction scenarios. For instance, when an application is launched on a wireless device (e.g., for the first time), a calibration process is initiated that detects how a user holds the wireless device while interacting with the application. Generally, this can be implemented by collecting sensor data that describes how a user grasps the wireless device, such as sensor data from contact-sensing sensors that detect regions of the wireless device that are in contact with the user. The different contact regions can then be correlated to antenna locations of the wireless device to identify antennas that may be occluded by the user's grasp and antennas that may be partially or fully free from occlusion.

Based on the calibration process, a state record can be generated that identifies the application and the user, and that identifies an antenna state for the antennas. The antenna state, for example, indicates for each antenna whether the antenna will likely exhibit good wireless performance based on this usage scenario (e.g., is likely unobstructed), or whether each antenna may exhibit poor wireless performance, e.g., is likely obstructed. Accordingly, when the application is subsequently active on the wireless device, the state record can be utilized to determine which antennas to maintain in an active state (e.g., an unobstructed antenna) and which antennas to maintain in an inactive state, e.g., obstructed antennas. This not only increases wireless performance of the wireless device by prioritizing antennas that are likely to provide better wireless signal reception and/or transmission, but also conserves power resources (e.g., battery charge) by maintaining antennas that are likely to perform poorly in an inactive state. Further, once a state record for a particular process (e.g., application or system process) is generated, the state record can be utilized to proactively adapt antenna state when the process is implemented on a wireless device, such as when a user selects the application to be executed. For instance, instead of relying on conventional reactive processes that monitor antenna performance and respond to changes in antenna performance which may result in wireless performance degradation due to lag time in responding to such changes, the described techniques proactively configure individual antennas based on process state, thus avoiding such performance interruptions.

While features and concepts of process based antenna configuration can be implemented in any number of different devices, systems, environments, and/or configurations, aspects of process based antenna configuration are described in the context of the following example devices, systems, and methods.

FIG. 1 illustrates an example environment 100 in which aspects of process based antenna configuration can be implemented. The example environment 100 includes a wireless computing device ("wireless device") 102 that is connectable to wireless networks 104. In this particular example, the wireless device 102 represents a portable device that can be carried by a user 106, such as a smartphone, a tablet device, a laptop, a wearable computing device, (e.g., a smartwatch or a fitness tracker), and so forth. These examples are not to be construed as limiting, however, and the wireless device 102 can be implemented in a variety of different ways and form factors. Further example attributes of the wireless device 102 are discussed below with reference to the device 1400 of FIG. 14.

The wireless device 102 includes various functionality that enables the wireless device 102 to perform different aspects of process based antenna configuration discussed herein, including a connectivity module 108 and a sensor system 110. The connectivity module 108 represents functionality (e.g., hardware and logic) that enables the wireless device 102 to communicate wirelessly, such as for wireless data and voice communication. The connectivity module 108, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth. The connectivity module 108 also includes antenna modules 112 and device connectivity data ("device data") 114.

The antenna modules 112 represent functionality (e.g., hardware and logic) for enabling the wireless device 102 to send and receive wireless signal, such as for wireless connectivity to the wireless networks 104. At least some individual antenna modules 112, for instance, each include a physical antenna device that is operable to receive wireless signal transmitted by the wireless networks 104, and to transmit wireless signal for receipt by the wireless networks 104. The antenna modules 112 may include other hardware and logic, for as for adapting operating parameters of physical antennas. In at least one implementation, at least some of the antenna modules 112 represent antennas without integrated logic, such as patch antennas and/or arrays of antennas that are communicatively connected to the connectivity module 108. In at least some implementations, the wireless device 102 may employ instances of the antenna modules 112 physically arranged at different locations on the wireless device 102, such as to optimize wireless performance of the wireless device 102.

For instance, the environment 100 depicts an internal view 116 that represents a view of the wireless device 102 with a surface removed, such as a display screen of the wireless device 102. Depicted in the internal view 116 is an antenna module 112a, antenna module 112b, antenna module 112c, and antenna module 112d, which represent different instances of the antenna modules 112. As shown, the antenna modules 112a-112d are each positioned at different physical locations on the wireless device 102. Further, the antenna modules 112a-112d are interconnected to provide an integrated antenna structure for enabling the wireless device to send and receive wireless signal. This particular arrangement of antenna modules 112 is presented for purpose of example only, and it is to be appreciated that the described implementations can utilize a variety of different arrangements of antennas not expressly described herein.

The wireless device 102 generates and/or maintains the device data 114, which is representative of various types of data that is used and/or observed by the connectivity module 108. The device data 114, for instance, includes attributes of wireless signal received and/or detected by the connectivity module 108, such as base station identifiers, received signal strength indicator (RSSI), signal strength (e.g., in dBm), signal frequency band, signal quality (e.g., signal-to-noise (S/N) ratio), and so forth. The device data 114 also includes various device state information for the wireless device 102, such as described in more detail below.

In at least one implementation, the connectivity module 108 wirelessly connects the wireless device 102 to the wireless networks 104 via interaction between the connectivity module 108 and network connectivity devices 118. Generally, the network connectivity devices 118 are representative of functionality to receive and transmit wireless signal and serve as access portals for the wireless networks 104. Examples of the network connectivity devices 118 include a wireless cellular base station, a wireless access point (e.g., for a WLAN and/or a Wireless Wide Area Network (WWAN)), a short-range wireless network access point, and so forth. In at least one implementation, the network connectivity device 118 and/or the wireless networks represent wireless signal sources for the wireless device 102.

The sensor system 110 is representative of functionality to detect various physical and/or logical phenomena in relation to the wireless device 102, such as motion, light, image detection and recognition, time and date, position, location, touch detection, temperature, and so forth. To enable the sensor system 110 to detect such phenomena, the sensor system 110 includes sensors 120 that are configured to generate sensor data 122. Examples of the sensors 120 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 122 represents raw sensor data collected by the sensors 120. Alternatively or in addition, the sensor data 122 represents raw sensor data from the sensors 120 that is processed to generate processed sensor data, such as sensor data from multiple sensors 120 that is combined to provide more complex representations of wireless device 102 state than can be provided by a single sensor 120.

The wireless device 102 further includes processes 124, examples of which include applications 126 and system processes 128. Generally, the processes are representative of different tasks that can be executed via the wireless device 102. For instance, the applications 126 represent programs that are executable via the wireless device 102 to perform various tasks, such as web browsing, social media interaction, content consumption (e.g., video and/or audio streaming), online shopping, mobile payments, productivity tasks, and so forth. The system processes 128 represent processes for performing various system-related tasks for the wireless device 102, such as configuring various system settings of the wireless device. In at least one implementation, the system processes 128 are hosted by an operating system of the wireless device 102.

Further to techniques described herein, the device data 114 further includes a state database 130, which stores various state information generating as part of the calibration processes described herein. For instance, as detailed below, different state records can be generated that describe antenna states for the antenna modules 112 in different usage scenarios. These antenna states can be stored in the state database 130, and utilized to proactively configure the antenna modules 112 based on various changes in device state, such as based on activity related to the processes 124.

The environment 100 further includes a connectivity service 132 which is connected to and accessible via the wireless networks 104. The wireless device 102, for instance, can interact with the connectivity service 132 to obtain various connectivity-related information and services. For example, the connectivity service 132 includes service wireless data ("service data") 134, which represents various wireless connectivity-related data obtained by the connectivity service 132 in different ways. The service data 134, for instance, can include overlapping and/or identical information to the device data 114. Further details concerning how the service data 134 is obtained and utilized are discussed below.

Figure 2:
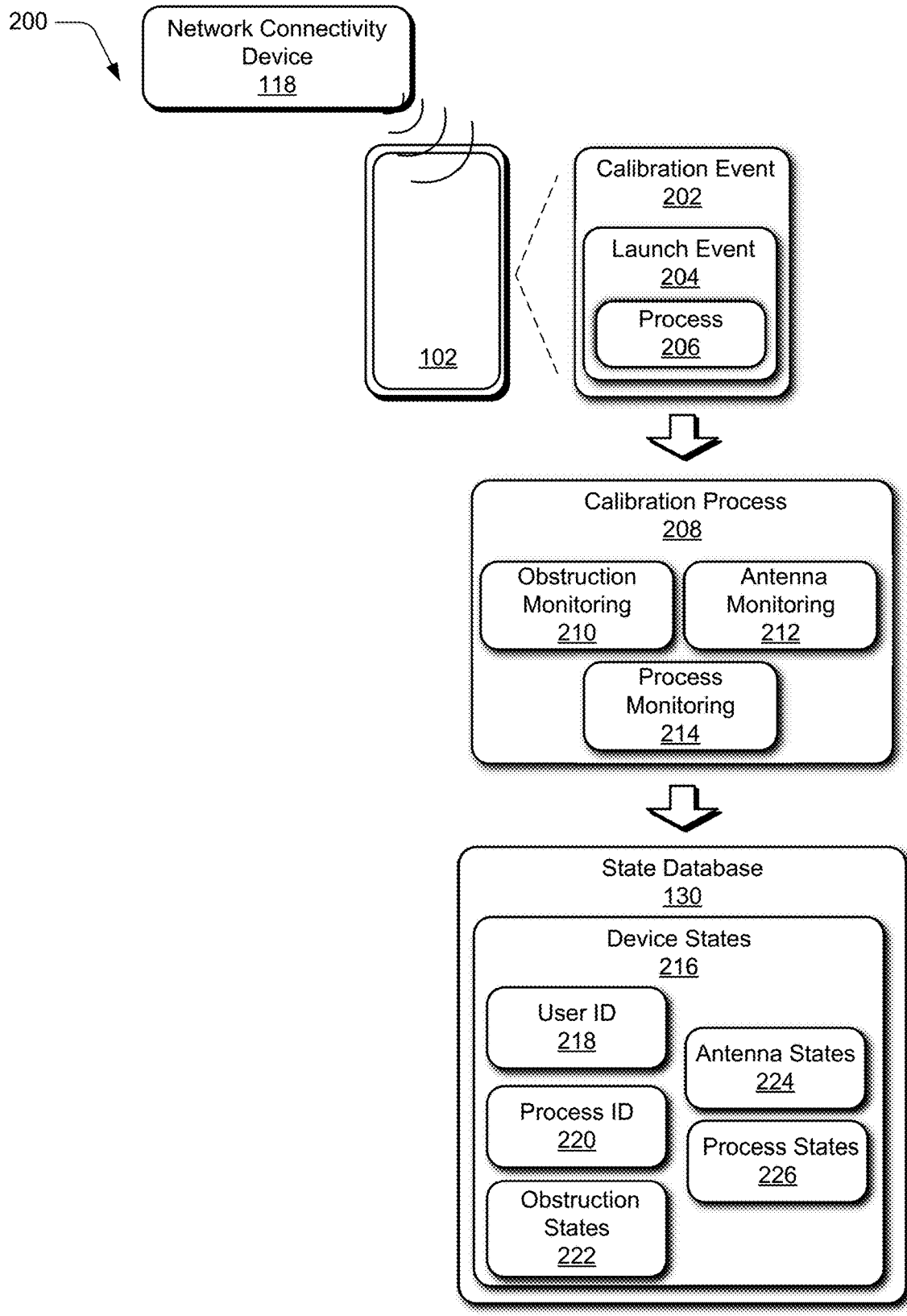
FIG. 2 depicts a scenario for performing aspects of a wireless calibration process for a wireless device in accordance with one or more implementations.

FIGS. 2-9 depict different aspects of implementations for process based antenna configuration. For instance, FIG. 2 depicts a scenario 200 for performing aspects of a wireless calibration process for a wireless device. In the scenario 200, a calibration event 202 occurs indicating that the wireless device 102 is to calibrate its wireless connectivity. According to various implementations, the connectivity module 108 can detect the calibration event 202 based on different detected occurrences. In this particular example, the calibration event 202 is based on a process launch event 204 via which the connectivity module 108 detects that a process 206 is launched. Generally, the process 206 represents an implementation of a process 124. For instance, the launch event 204 occurs based on the user 106 launching an instance of an application 126.

Based on the calibration event 202, the connectivity module 108 initiates a calibration process 208 for calibrating wireless connectivity of the wireless device 102. As part of the calibration process 208, the connectivity module 108 performs obstruction monitoring 210. Generally, the obstruction monitoring 210 determines how a user is holding (e.g., grasping) the wireless device 102, such as based on a position of a user's hand(s) relative to the wireless device 102. The sensor system 110, for example, leverages the sensors 120 to detect which portions of the wireless device 102 are in contact with the user's hand and/or other object, such as a different portion of the user's body, a physical object other than the user (e.g., a phone holder, furniture, and so forth), and so on. In this way, the connectivity module 108 can receive obstruction position information from the sensor system 110 as part of the obstruction monitoring 210, and can correlate the obstruction position information to different device states of the wireless device 102.

Optionally, the calibration process 208 includes antenna monitoring 212 and process monitoring 214. The antenna monitoring 212, for instance, monitors wireless signal state at different instances of the antenna modules 112, such as different signal conditions of wireless signal received at instances of the antenna modules 112. Generally, wireless signal condition can include signal strength, signal quality, and so forth. The process monitoring 214 determines different states of the process 206, such as different execution states, different functionalities accessed by the user, execution time of the process 206, and so forth.

Further to the scenario 200, results of the calibration process 208 are stored to the device data 114 as part of device states 216 that include data describing different device states that occur in relation to (e.g., during) the calibration process 208. In this example, the device states 216 include user identifier (ID) 218, process identifier (ID) 220, and obstruction states 222. The user ID 218 identifies a user associated with the wireless device 102, such as a user that is authenticated with the wireless device 102 during the calibration process, and/or a user that is identified as interacting the with wireless device 102 during the calibration process. For instance, sensor data 122 from the sensor system 110 can be utilized to identify a particular user, such as based on biometric attributes that are detected and correlated to the user ID 218. The process ID 220 identifies a process 124 involved in the calibration process 208, which in this example is the process 206.

The obstruction states 222 include results of the obstruction monitoring 210, and generally describe different obstruction positions of the wireless device 102 that occurred as part of the calibration process 208. The obstruction states 222, for example, can describe different obstruction patterns (e.g., collections of points) on the wireless device 102 that were in contact with a user as part of the calibration process, time duration of each obstruction pattern, timestamps for each obstruction pattern, and so forth.

Optionally, the device states 216 include antenna states 224 and process states 226. The antenna states 224 describe different wireless signal conditions observed as part of the antenna monitoring 212, such as signal strength and/or signal quality observed at different points during the calibration process 208. The process states 226 identify different states of the process 206 that are identified as part of the process monitoring. For example, the process states 226 can identify a time of day at which the process 206 was launched, a duration of execution of the process 206 (e.g., a lapsed time between process launch and process termination), how frequently the user interacted with the process, which functionality of the process was accessed, and so forth.

In at least some implementations, the various states described in the device states 216 can be correlated with one another to indicate relationships between the different states. For instance, a change in a process state 226 may be correlated with a change in an obstruction state 222, or vice-versa. This is presented as but one example, and it is to be appreciated that various interrelationships between the different states can be identified and utilized further to the techniques described herein.

In at least some implementations, the calibration process 208 may iterate for a period of time and may terminate based on an occurrence of a termination event, such as a calibration timer elapsing, termination of the process 206, the connectivity module 108 determining that a threshold number of data points (e.g., different device states 216) have been collected, the connectivity module 108 determining that a obstruction position of the wireless device 102 has not changed for a threshold period of time, and so forth. Thus, the device states 216 may be dynamically updated during the calibration process to provide a robust data set that is stored and used for optimizing wireless performance of the wireless device 102 in different scenarios. Consider now a discussion of some example device states.

Figure 3:
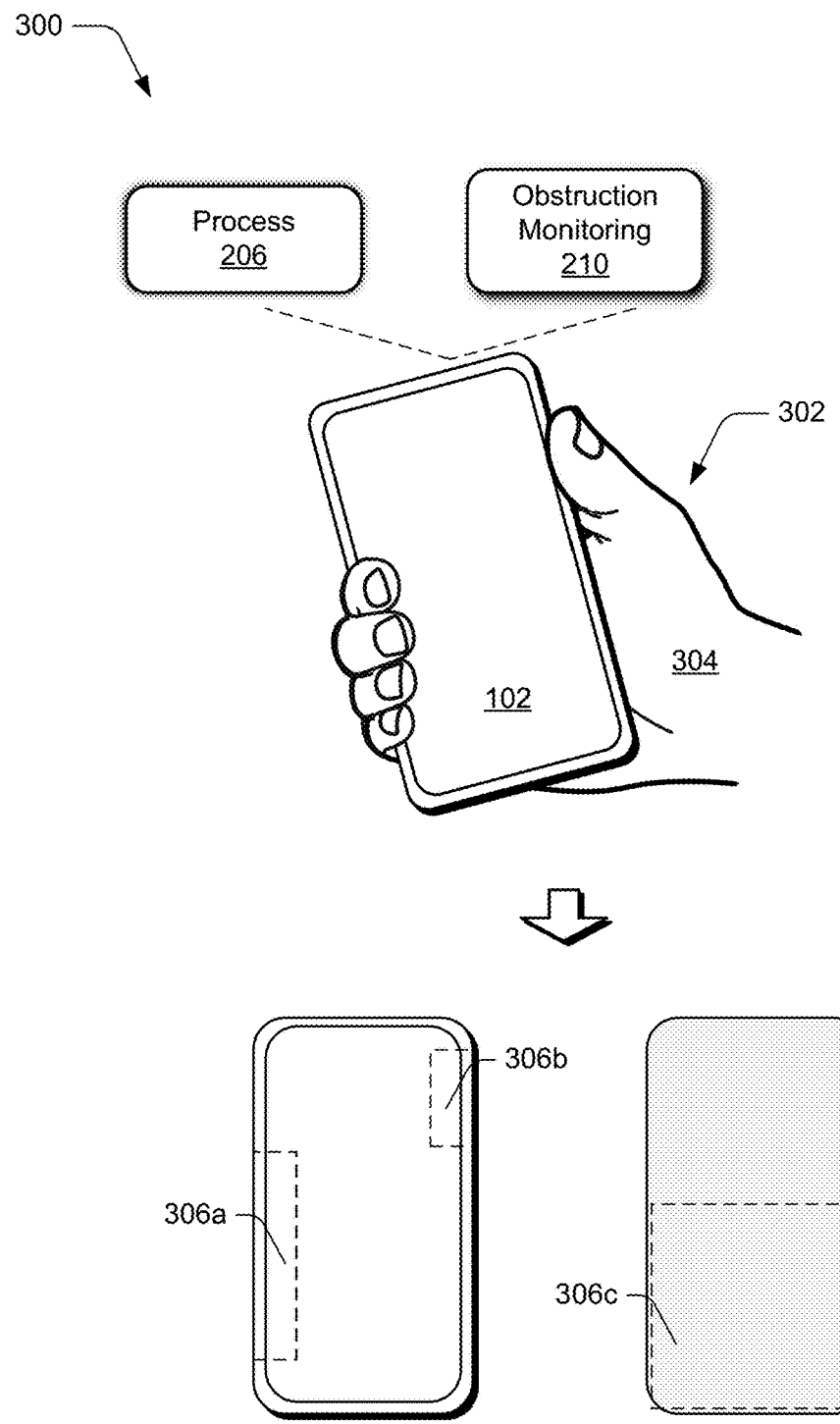
FIG. 3 depicts a scenario for identifying different device states for calibrating the wireless device in accordance with one or more implementations.

FIG. 3 depicts a scenario 300 for identifying different device states for calibrating the wireless device 102. In the scenario 300, a user interacts with the wireless device 102 while the calibration process 208 is active. The user, for instance, launches the process 206, which generates a calibration event 202 to initiate the calibration process 208. The user interacts with the process 206 via the wireless device 102, such as by providing input to the wireless device 102 to access functionality of the process 206. Further, during interaction with the process 206, the user holds the wireless device 102 with a grip 302 of their hand 304.

Accordingly, the connectivity module 108 performs the various state monitoring described above. For instance, the obstruction monitoring 210 identifies portions of the wireless device 102 that are occluded by (e.g., in contact with and/or in proximity to) the grip 302. The sensor system 110, for example, utilizes the sensors 120 to identify which regions of the wireless device 102 are occluded by the user's hand 304. Generally, this can involve various types of sensors 120, such as a capacitive sensor, pressure sensor, a temperature sensor, an optical sensor, and so forth. Accordingly, the sensor system detects that the grip 302 occludes regions 306a, 306b, and 306c of the wireless device 102. The occluded regions 306a, 306b, for instance, are on a front surface and/or side edge of the wireless device 102, and the occluded region 306c is on a rear surface of the wireless device 102. For example, the occluded region 306a represents a portion of the wireless device 102 occluded by the user's fingertips, the occluded region 306b is occluded by the user's thumb, and the occluded region 306c is occluded by the palm of the user's hand 304. These are presented for purpose of example only, and it is to be appreciated that various objects may be detected as occluding portions of the wireless device 102, such as a user's face (e.g., in a phone call scenario), an external object such as a desk, a phone holder (e.g., in a vehicle), and so forth.

Figure 4:
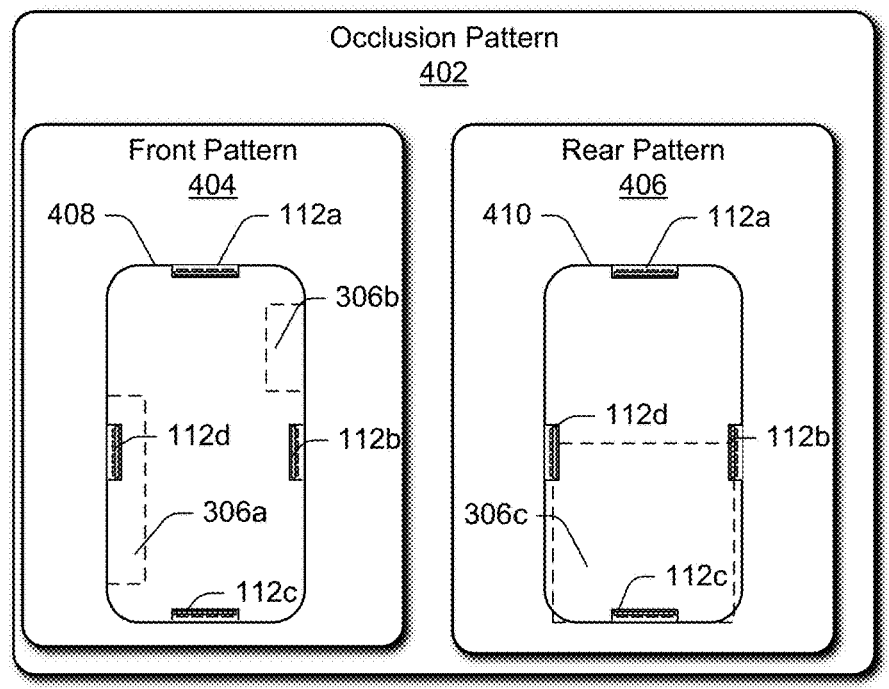
FIG. 4 depicts a scenario for generating an occlusion pattern as part of a calibration process in accordance with one or more implementations described herein.
Figure 4:

FIG. 4 depicts a scenario 400 for generating an occlusion pattern as part of a calibration process. The scenario 400, for instance, is performed in conjunction with the scenario 300 and as part of the calibration process 208. In the scenario 400, based on identification of the occluded regions 306a-306c, an occlusion pattern 402 is generated. Generally the occlusion pattern 402 includes a front pattern 404 and a rear pattern 406, which include a front mapping 408 and a rear mapping 410 of the wireless device 102, respective. The front mapping 408 is a data representation of a front surface of the wireless device 102, such as a coordinate map that describes the physical bounds of the front surface. Further, the rear mapping 410 is a data representation of a rear surface of the wireless device 102, such as a coordinate map that describes the physical bounds of the rear surface.

The front pattern 404 identifies the occluded regions 306a, 306b relative to the front mapping 408, and the rear mapping identifies the occluded region 306c relative to the rear mapping 410. Further, and as depicted in the scenario 400, the front mapping 408 and the rear mapping 410 describe relative positions of the antenna modules 112a-112d on the wireless device 102. In this way, the occlusion pattern 402 can indicate whether any of the antenna modules are occluded, and a relative amount of occlusion. In this example, the front pattern indicates that the antenna module 112d is likely occluded by the occluded region 306a. Further, the antenna module 112c may be partially or fully occluded by the occluded region 306c. The antenna modules 112b, 112d may be partially occluded by the occluded region 306c, and the antenna module 112a may be free from obstruction, e.g., non-occluded.

Thus, the occlusion pattern 402 describes different physical regions of the wireless device 102 and antenna modules 112 that are occluded by the grip 302, and antenna modules 112 that are likely occluded, partially occluded, or non-occluded. The occlusion pattern 402 is accordingly identified as an obstruction state 412 of the wireless device as part of the calibration process 208, which represents an example implementation of the obstruction states 222.

Figure 5:
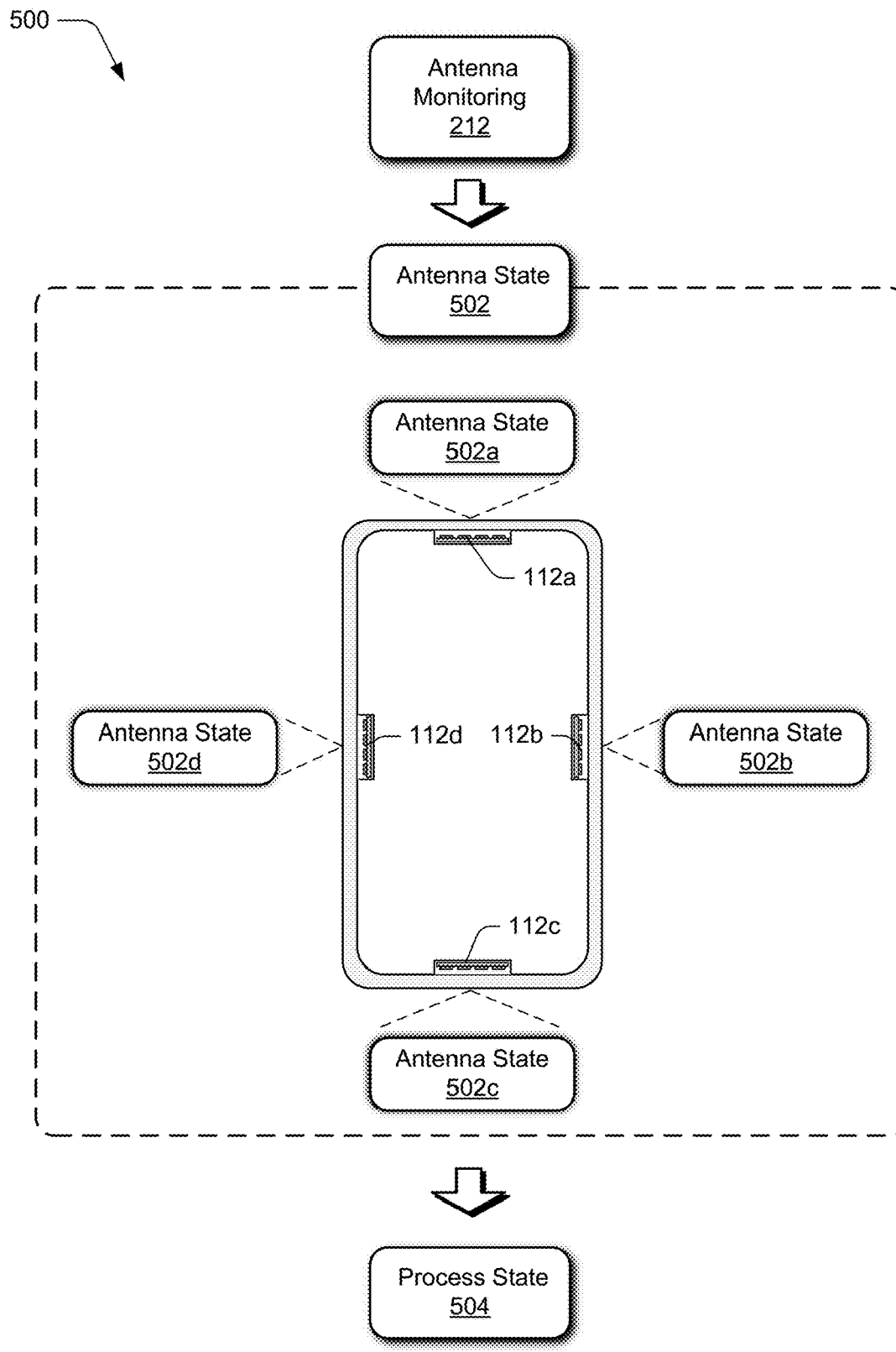
FIG. 5 depicts a scenario for determining antenna state as part of a calibration process in accordance with one or more implementations described herein.

FIG. 5 depicts a scenario 500 for determining antenna state as part of a calibration process. The scenario 500, for instance, is optionally performed in conjunction with the scenarios 300, 400 and as part of the calibration process 208. In the scenario 500, antenna state of the different antenna modules 112 is determined, such as part of the antenna monitoring 212. The connectivity module 108, for instance, monitors wireless signal condition at each of the antenna modules 112. The connectivity module 108 then defines the antenna states 502 based on signal condition observed at each of the antenna modules 112. The connectivity module 108, for example, defines a separate antenna state 502a-502d for each of the antenna modules 112, and each antenna state 502a-502d describes wireless signal condition observed at each of the antenna modules 112 as part of the calibration process 208.

Generally, an antenna state 502 at a particular antenna module 112 can describe wireless signal condition in various ways. For instance, wireless signal condition can be described quantitatively across the calibration process 208, such as wireless signal strength (e.g., RSSI, dBm) and/or wireless signal quality (e.g., S/N ratio) observed at various time steps during the calibration process 208. Additionally or alternatively, wireless signal condition can be described qualitatively, such as by comparing observed signal condition to a signal threshold that is defined based on signal strength and/or signal quality. For instance, an antenna state 502 for an antenna module 112 that meets the signal threshold for the calibration process 208 can be indicated as "good," wherein as an antenna state for an antenna module 112 that is below the signal threshold can be indicated as "poor." In at least one implementation, observed wireless signal condition of an antenna module 112 can be averaged over the time span of the calibration process 208 to define the antenna module's overall antenna state 502 for the calibration process. Thus, the antenna state 502 describes wireless signal condition observed at each antenna module 112 over the calibration process 208.

For example, with the wireless device 102 held in the grip 302, the antenna module 112a may be free of occlusion and thus may exhibit good wireless performance. Thus, the antenna state 502a may indicate a good wireless condition. However, in the grip 302, the antenna module 112d may be occluded by the user's thumb and thus may exhibit poor wireless performance. Accordingly, this performance attribute of the antenna module 112d may be reflected in the antenna state 502d.

In conjunction with the obstruction monitoring 210 and the antenna monitoring described above, the process monitoring 214 may also be performed to generate process state 504. Accordingly this various state information combines to provide an overall indication of the device states 216 for the wireless device 102 that occur as part of (e.g., during) the calibration process 208.

Figure 6:
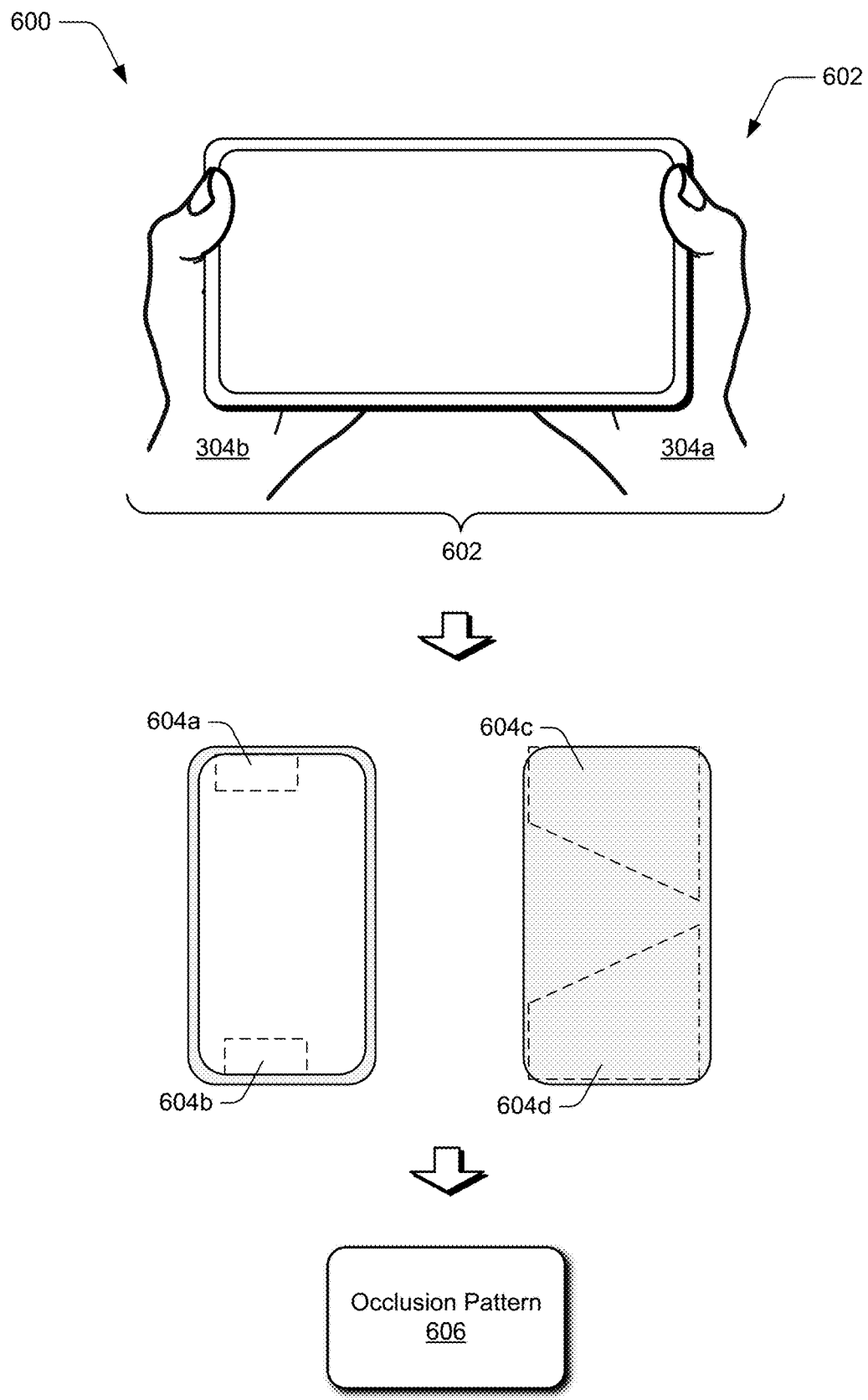
FIG. 6 depicts a scenario for detecting a grip change during a calibration process in accordance with one or more implementations described herein.

In some scenarios, during a calibration process, a user may switch their grip on a device being calibrated. For instance, FIG. 6 depicts a scenario 600 for detecting a grip change during a calibration process. The scenario 600, for instance, represents a continuation of the scenarios 300-500, and may occur while the calibration process 208 described in those scenarios is still active. In the scenario 600, the user switches from the grip 302 to a grip 602 of the wireless device 102 while the process 206 remains active. As illustrated, the grip 602 involves the user grasping the wireless device 102 with two hands 304a, 304b. Accordingly, the sensor system 110 identifies regions of the wireless device 102 that are occluded by the grip 602 of the user's hands 304a, 304b. The sensor system 110, for instance, detects occluded regions 604a, 604b on the front surface of the wireless device 102, and occluded regions 604c, 604d on the rear surface of the wireless device 102. The sensor system 110 notifies the connectivity module 108 of the occluded regions 604a-604d, such as via a push and/or pull notification. Accordingly, the connectivity module 108 generates an occlusion pattern 606 that describes the occluded regions 604a-604d relative to the wireless device 102, e.g., front and rear surfaces of the wireless device 102. Further, the occlusion pattern 606 may also indicate whether any of the antenna modules 112 are likely occluded and if so, which antenna modules. Generally, the occlusion pattern 606 may be generated and implemented similarly to the occlusion pattern 402, discussed above.

Figure 7:
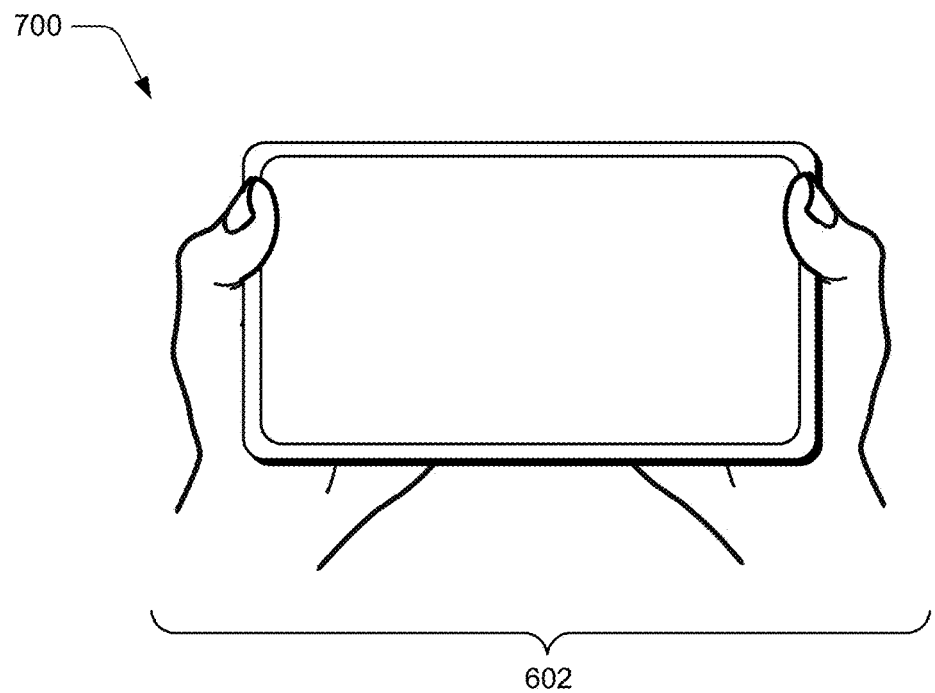
FIG. 7 depicts a scenario for incorporating a change in obstruction state into a calibration process in accordance with one or more implementations described herein.
Figure 7:
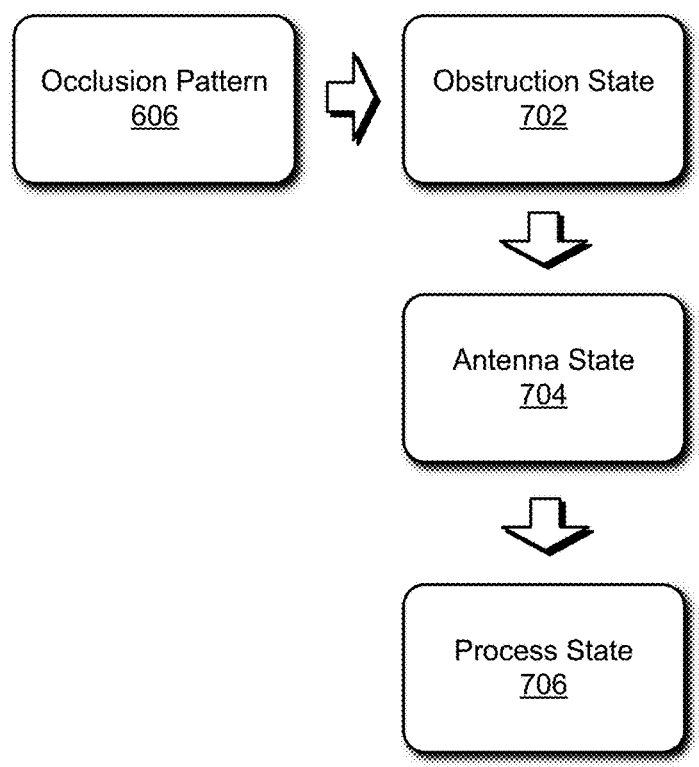

FIG. 7 depicts a scenario 700 for incorporating a change in obstruction state into a calibration process. The scenario 700, for instance, represents a continuation of the scenarios 300-700. In the scenario 700, the connectivity module 108 identifies the occlusion pattern 606 as an obstruction state 702 of the wireless device 102 as part of the calibration process 208. Optionally, the connectivity module 108 performs further antenna monitoring 212 to ascertain antenna state 704 of the antenna modules 112 while the wireless device 102 is held via the grip 602, e.g., the obstruction state 702. The antenna state 704, for instance, describes wireless signal conditions at the individual antenna modules 112. For instance, the change from the grip 302 to the grip 602 may alter performance characteristics of an antenna module 112. An antenna module 112 that was previously occluded by the grip 302 (e.g., the antenna module 112d) may no longer be occluded by the grip 602, and thus may exhibit a better wireless signal condition in the grip 302. Further, an antenna module 112 that previously exhibited good wireless signal condition in the grip 302 (e.g., the antenna module 112a) may now be occluded by the grip 602, and thus may exhibit decreased (e.g. poor) wireless signal condition. In at least some implementations, process monitoring 214 may be performed to ascertain a process state 706 while the wireless device 102 is held via the grip 602.

While the example obstruction states presented above are discussed in the context of a user gripping the wireless device 102, it is to be appreciated that the described techniques may also be employed to detect a wide variety of other obstruction states and to perform antenna configuration for the different obstruction states, such as when a wireless device is placed on a user's lap, when a wireless device is placed into a phone holder (e.g., for hands free operation in a vehicle), when a wireless device is placed on a piece of furniture (e.g., on a desk), and so forth.

Figure 8:
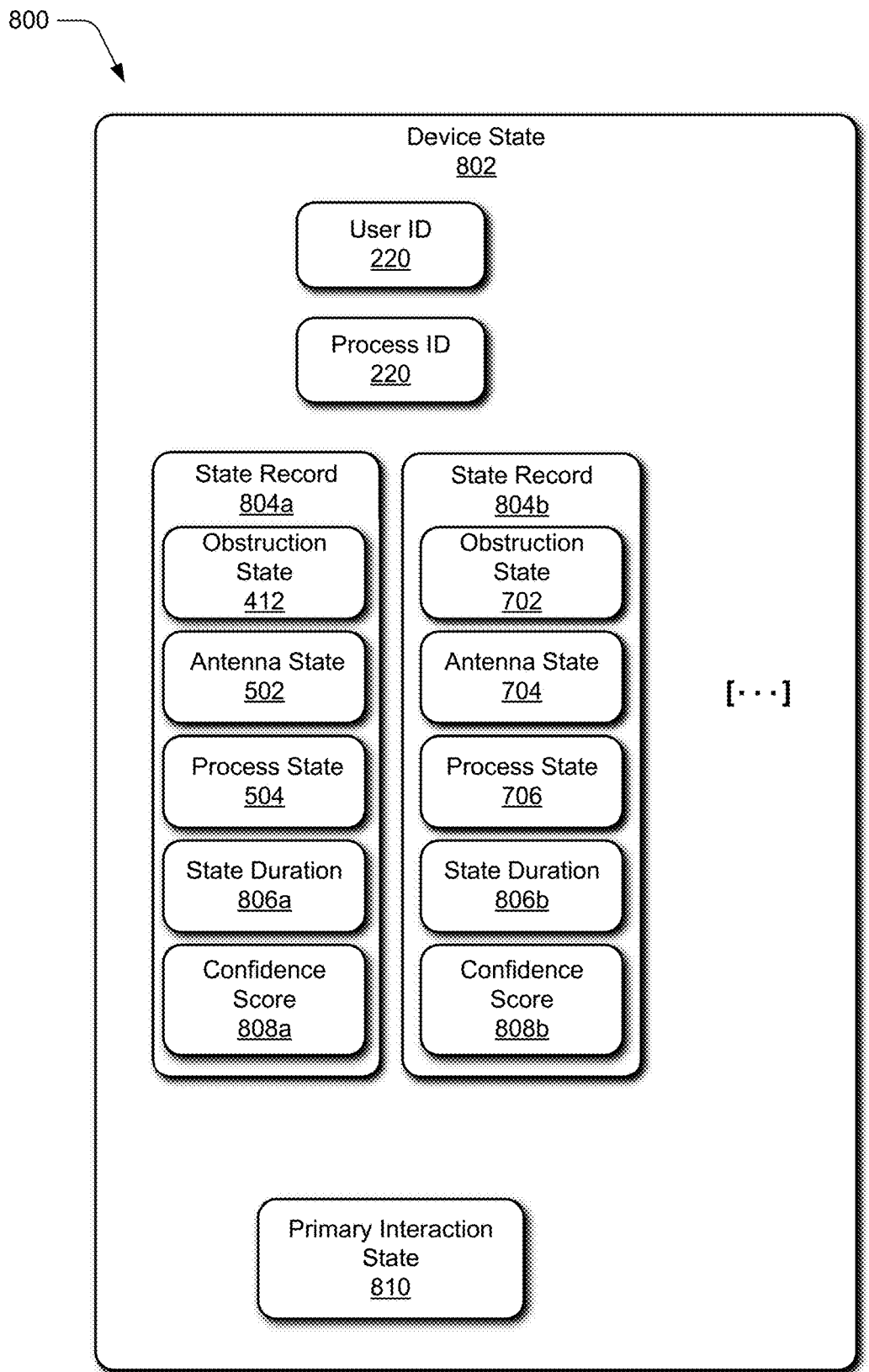
FIG. 8 depicts a scenario for generating a representation of device state ascertained as part of a calibration process in accordance with one or more implementations described herein.

FIG. 8 depicts a scenario 800 for generating a representation of device state ascertained as part of a calibration process. The scenario 800, for instance, occurs in conjunction with the scenarios 300-800. In the scenario 800, the connectivity module 108 aggregates the various state information generated as part of the monitoring activities described above into a device state 802, which is based on the user ID 218 and the process ID 220 involved in the calibration process 208 described above. Further, the device state 802 includes different state records 804 that are based on different states observed as part of the calibration process 208. A state record 804a, for instance, is based on the obstruction state 412, and includes the antenna state 502 and the process state 504. Further, a state record 804b is based on the obstruction state 702, and includes the antenna state 704 and the process state 706. While two different state records 804 are depicted in the scenario 800, it is to be appreciated that any number of state records may occur during a calibration process, such as more or less than two.

Each of the state records 804 include a respective state duration 806, which represents a time value indicating how long each state record 804 occurred as part of the calibration process 208. For instance, a state during 806a of the state record 804a indicates a duration of time that the obstruction state 412 occurred as part of the calibration process, and a state duration 806b indicates a duration of time that the obstruction state 702 occurred as part of the calibration process. The state durations 806a, 806b, for example, indicate durations of time the user grasped the wireless device 102 via the grips 302, 602, respectively. In an implementation where a user changes grip multiple times over a calibration process 208 such that a particular instance of a obstruction state occurs multiple different times over the calibration process, a state duration 806 for the obstruction state can be determined as a cumulative total time duration that the obstruction state occurred as part of the calibration process.

Each of the state records 804 further includes a confidence score 808, which indicates a confidence that a respective state record 804 is a primary interaction, e.g., for the user ID 218 and the process ID 220. In at least one implementation, a confidence score 808 for a particular state record 804 is calculated based on a respective state duration 806. For instance, consider a first scenario where the calibration process 208 proceeds for a calibration period of 5 minutes. Further, the state duration 806a for the state record 804a over the calibration period is 30 seconds, and the state duration 806b for the state record 804b is 4 minutes, 30 seconds. Accordingly, the confidence score 808b for the state record 804*b* may be high (e.g., 0.9), whereas the confidence score 808*a* for the state record 804*a* may be lower, e.g., 0.1. In at least one implementation, this indicates that the state record 804*b* is a primary interaction state.

Consider another example where, for a same duration of calibration period, the state duration 806*a* for the state record 804*a* over the calibration period is 2 minutes, 20 seconds, and the state duration 806*b* for the state record 804*b* is 2 minutes, 40 seconds. Accordingly, the confidence scores 808*a*, 808*b* may be similar and may be low, e.g., 0.54 and 0.56, respectively. Since the confidence scores 808*a*, 808*b* are low and/or are similar, neither state record 804*a*, 804*b* may be identified as a primary interaction state.

In an implementation where a confidence score 808 for a particular state record 804 exceeds a threshold confidence score, and/or where the confidence score 808 exceeds a threshold difference between confidence scores for other state records 804, the particular state record 804 can be designated by the connectivity module 108 as a primary interaction state 810. The primary interaction state 808, for instance, is based on a state record 804 that occurs most frequently for the user ID 218 and the process ID 220.

Figure 9:
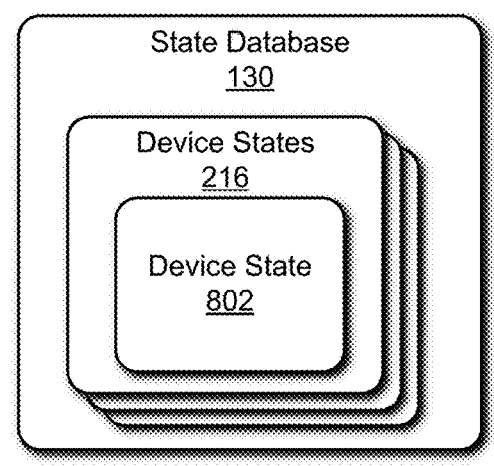
FIG. 9 depicts a method for calibrating wireless performance of a wireless device in accordance with one or more implementations described herein.

FIG. 9 depicts an example implementation of the state database 130, which stores different device states 216 including the device state 802 detailed above. Generally, each device state 130 corresponds to a different instance of a process ID 220 and/or a user ID 218, and thus can be used to configure wireless connectivity of a device based on matching a current user ID and/or process ID of the device to a corresponding device state 216. For instance, based on a matching device state 216, antenna state information from the device state can be utilized to determine which antenna(s) to activate or deactivate, and which antenna(s) to optimize. Further, the state database 130 is portable and can be shared between different devices to enable wireless performance optimization across the different devices. For instance, when the calibration process 208 is performed on the wireless device 102 to generate device state(s) 216 for the state database 130, the generated device state(s) can be shared to the connectivity service 132 and saved to the service data 134. The connectivity service 132 can make the device state(s) 216 available to other devices, such as in response to a request from a different device for device state information. Alternatively or in addition, the wireless device 102 can directly share the device state information, such as via direct device-to-device communication with another wireless device.

Figure 10:
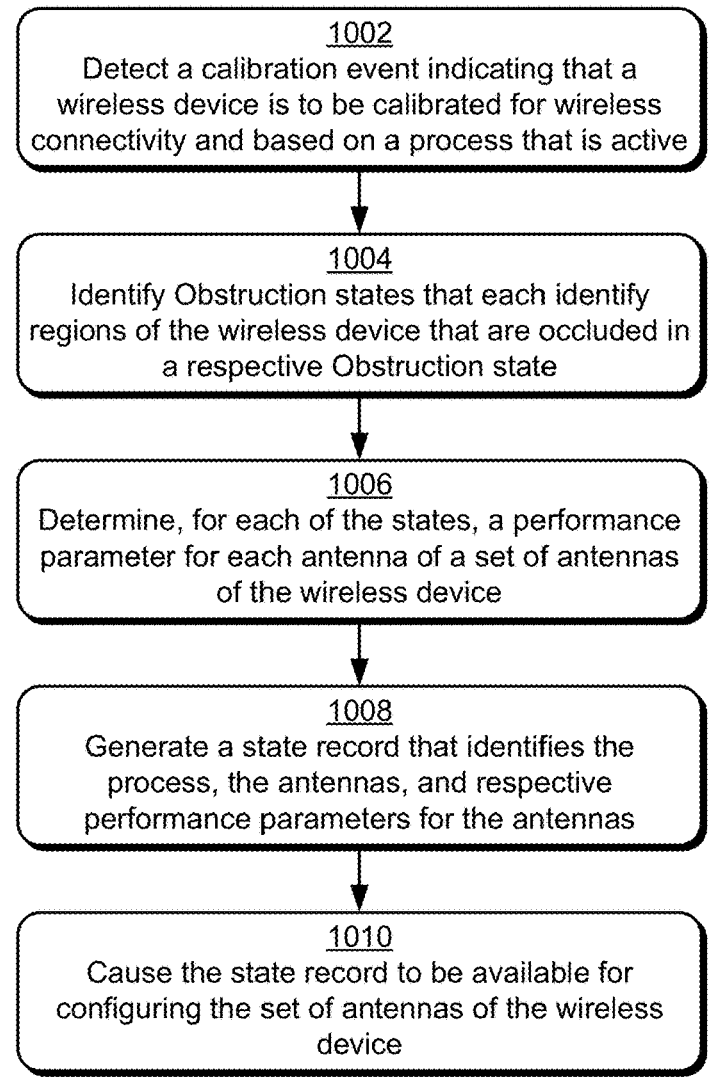
FIG. 10 depicts a method for performing tasks while positioned at an optimal position for wireless communication in accordance with one or more implementations described herein.

FIG. 10 depicts a method 1000 for calibrating wireless performance of a wireless device. At 1002, a calibration event pertaining to a wireless device is detected indicating that a wireless device is to be calibrated for wireless connectivity and based on a process that is active on the wireless device. The connectivity module 108, for instance, detects that a process 124 is launched on the wireless device, such as based on a user initiating an application 126 or a system process 128. Accordingly, the calibration process 208 is initiated.

At 1004, obstruction states are identified that each identify regions of the wireless device that are occluded in a respective obstruction state. For example, the sensor system 110 detects regions of the wireless device 102 that are occluded in each obstruction state, such as regions in contact with and/or obstructed by a user's grasp of the wireless device 102. As described above, an obstruction state can correspond to an identified occlusion pattern that describes regions of a device that are occluded in the obstruction state.

At 1006, for each of the obstruction states, a performance parameter is determined for each antenna of a set of antennas of the wireless device. Each performance parameter, for instance, is based on whether a respective antenna is at least partially occluded in a respective obstruction state. For each obstruction state, for instance, the connectivity module 108 maps occluded portions of the wireless device 102 to known locations for the antenna modules 112 to ascertain which antenna modules are likely occluded. A performance parameter can be specified in various ways, such as whether a respective antenna module 112 is partially or completely occluded, or is not occluded, e.g., is free of obstruction. Alternatively or in addition, a performance parameter can be specified as an antenna quality descriptor that describes an estimated signal quality of a respective antenna module 112. For instance, if a particular antenna module 112 is determined to be occluded in an obstruction state, a performance parameter for the particular antenna module can be specified as "poor." If a particular antenna module 112 is determined to be partially occluded, a performance parameter can be specified as "fair." Further, if a particular antenna module 112 is determined to be free from occlusion (e.g., not obstructed), a performance parameter can be specified as "good." Generally, an antenna module 112 that identified as "poor" is expected to provide low quality wireless communication, whereas an antenna module 112 identified as "good" is expected to provide good quality wireless communication.

At 1008, a state record is generated that identifies the process, the antennas, and respective performance parameters for the antennas. For example, the connectivity module 108 generates a state record 804 that includes a process ID for the process, identifiers for individual antennas of the set of antenna modules 112, and a performance parameter for each antenna module. In at least one implementation, the state record 804 also includes a user ID 218 for a user involved in the calibration process.

As mentioned above, multiple state records 804 may be generated as part of a calibration process 208, such as when a user switches a grip of the wireless device 102 during the calibration process. Accordingly, each state record can be assigned a confidence score that indicates a relative confidence that a respective state record represents a primary interaction state for the wireless device 102. As discussed above, a confidence score for a state record may be calculated based on a time duration of an obstruction state associated with the state record, e.g., interaction state. In at least one implementation, a state record 804 with a highest confidence score is designated as a primary state record for the process, and for a particular user ID 218 that interacts with the process.

At 1010, the state record is caused to be available for configuring the set of antennas of the wireless device. The connectivity module 108, for instance, stores a state record 804 in the state database 130 for use in configuring the antenna modules 112 for wireless communication, such as when the process 124 identified by the state record 804 is subsequently launched on the wireless device 102. Generally, the state database 130 stores multiple different instances of state records that are associated with a different process but that may each be associated with a common user ID 218 such that the state records describe how an individual user interacts with different instances of processes 124. Further, the state database 130 may store device states 216 across multiple different user IDs 218 such that ways in which different users interact with different processes can be identified as utilized to configure operation of antenna modules 112 based on which user is currently involved, and which process is currently active.

Figure 11:
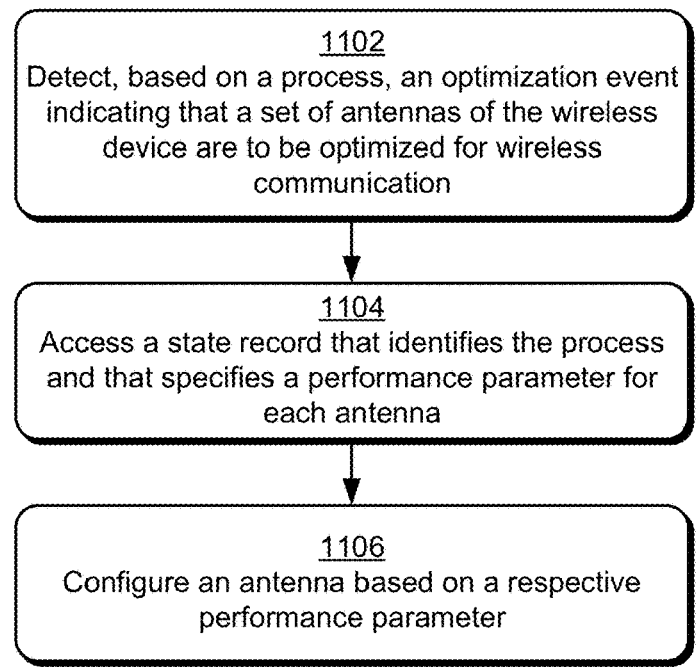
FIG. 11 depicts a method for configuring antennas of a wireless device in accordance with one or more implementations described herein.

FIG. 11 depicts a method 1100 for configuring antennas of a wireless device. At 1102, based on a process that is active on a wireless device, an optimization event is detected indicating that a set of antennas of the wireless device are to be optimized for wireless communication. The connectivity module 108, for instance, detects that an instance of a process 124 is launched on the wireless device 102, and/or that wireless connectivity of the wireless device 102 is to be optimized based on a process that is active on the wireless device 102. Generally, an "active" process may refer to a process that is scheduled to be executed, a process that is initializing execution, and/or a process that is currently executing, e.g., has at least one active thread on the wireless device 102.

At 1104, a state record is accessed that identifies the process and that specifies a performance parameter for each antenna. For example, the connectivity module 108 searches the state database 130 using a process ID 220 for the process to identify a state record 804 that includes the process ID 220. In at least one implementation, in addition to the process ID 220, the connectivity module 108 may also search using a user ID 218, such as for a user associated with the wireless device 102. A state record is identified that corresponds to the process ID and/or the user ID, and antenna performance parameters are identified from the state record.

At 1106, an antenna is configured based on a respective performance parameter. For instance an antenna is activated based on its respective performance parameter, or an antenna is deactivated based on its respective performance parameter. Consider, for instance, that a performance parameter for a particular antenna module 112 indicates that the antenna module is "good" according to the current state record. Accordingly, the particular antenna module 112 can be activated. If that particular antenna module is determined to be already active, the antenna module is left active. Consider another example where a performance parameter for a particular antenna module 112 indicates that the antenna module is "poor" according to the identified state record. Accordingly, the particular antenna module can be deactivated, e.g., turned off or left inactive if already inactive. For a set of multiple antenna modules 112, each antenna module can be configured based on its respective performance parameter.

Figure 12:
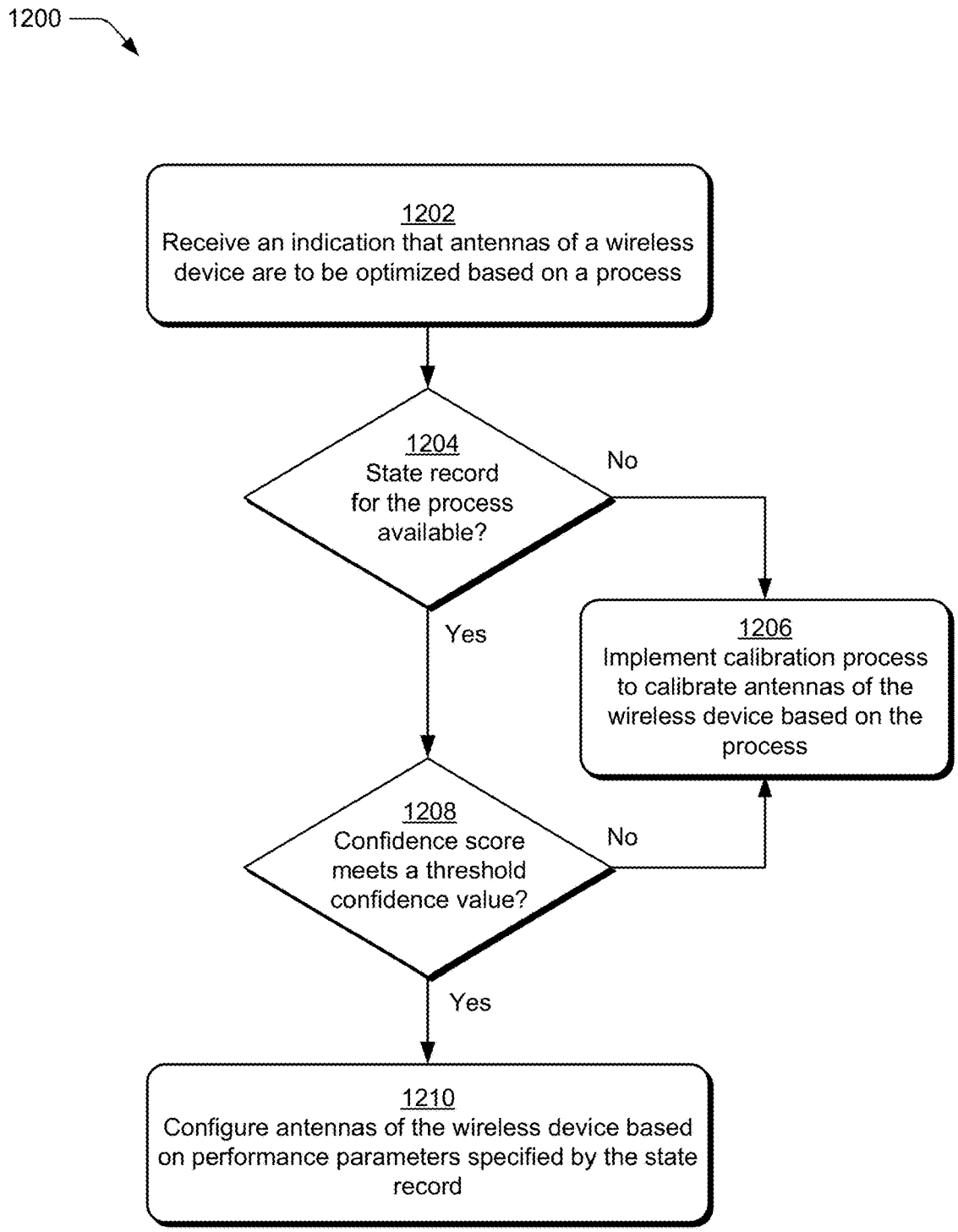
FIG. 12 depicts a method for configuring antennas of a wireless device in accordance with one or more implementations described herein.

FIG. 12 depicts a method 1200 for configuring antennas of a wireless device. At 1202, an indication is received that antennas of a wireless device are to be optimized based on a process. The connectivity module 108, for instance, determines that a process 124 is active on the wireless device 102, such as based on a process launch event or other indication of a process. In at least one implementation, antenna optimization may occur as a background process while the subject process is executing. Generally, this may occur to refresh optimization values in the state database 130 from time-to-time to account for possible user behavior changes (e.g., if a user adopts a different way of grasping the wireless device 102), and/or if the confidence scores are not high enough to make a decision on antenna configuration.

At 1204, it is determined whether a state record for the process is available. For example, the connectivity module 108 searches the state database 130 for a state record 804 using a process ID 220 for the process, and/or a user ID 218 for a user associated with the wireless device 102. If a state record for the process is not available ("No"), at 1206 a calibration process is implemented to calibrate antennas of the wireless device based on the process. The calibration processes described above, for instance, are performed, such as described with reference to the method 1000.

If a state record for the process is available, at 1208 it is determined if a confidence score for the state record meets a threshold confidence value. The connectivity module 108, for instance, compares a confidence score for an identified state record to a threshold confidence value. The threshold confidence value, for instance, is predefined prior to initiating device calibration and/or antenna optimization. Different ways for generating confidence scores are described above. If the confidence score for the state record meets the threshold confidence value ("Yes"), at 1210 antennas of the wireless device are configured based on performance parameters specified by the state record. The connectivity module 108, for instance, identifies a performance parameter in the state record, and configures an antenna module 112 based on the performance parameter. As described above, for instance, the connectivity module 108 can activate or deactivate an antenna module 112 based on whether a respective performance parameter indicates that that the antenna module has a "poor" estimated signal condition, or a "good" or "fair" estimated signal condition. In at least one implementation, step 1210 implements the method 1100 for configuring a set of antennas of a wireless device using information in the state record.

If the confidence score for the state record does not meet the threshold confidence value ("No"), the method proceeds to 1206 where a calibration process is implemented to calibrate antennas of the wireless device based on the process. In at least one implementation, this represents a recalibration of the wireless device for the process, such as where a previous calibration process did not result in a state record with a sufficient reliable confidence value. Based on the calibration process, a new state record is generated for the process, or a previously generated state record with a low confidence score is updated. The state record may then be utilized to configure antennas of the wireless device, such as described above.

Figure 13:
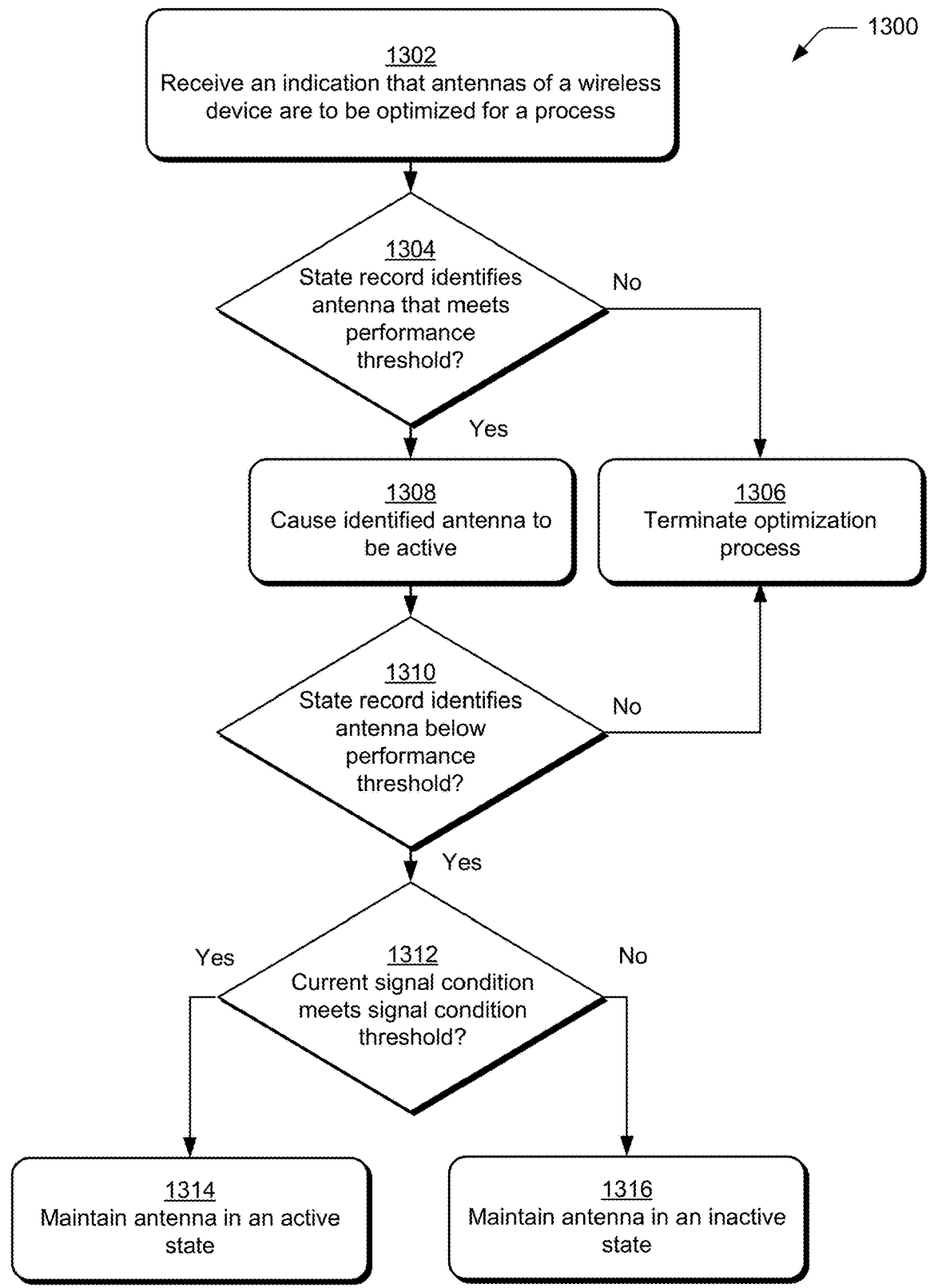
FIG. 13 depicts a method for configuring antennas of a wireless device in accordance with one or more implementations described herein.

FIG. 13 depicts a method 1300 for configuring antennas of a wireless device. At 1302, an indication is received to optimize antennas of a wireless device for a process. The connectivity module 108, for instance, detects an optimization event, such as based on launch of a process 124 on the wireless device 102. At 1304, it is determined whether a state record associated with the process identifies an antenna that meets a performance parameter threshold. For example, the connectivity module 108 locates a state record 804 that correlates with the process (e.g., based on a matching process ID 220), and determines whether the state record identifies any antennas that meet a performance parameter threshold. For instance, a performance parameter threshold can be defined as antennas that are identified as "good" or "fair," such as based on the calibration processes described above. Alternatively or in addition, a performance parameter threshold can be defined based on relative occlusion of antennas based on an obstruction state, such as antennas that are free from occlusion or only partially occluded.

If the state record does not identify an antenna that meets the performance parameter threshold ("No"), at 1306 the optimization process terminates. In at least one implementation, based on termination of the optimization process, a default device behavior can be implemented for adapting antenna performance, such as a reactive behavior that monitors wireless performance of antennas and adapts antennas to compensate for observed changes in antenna performance. Alternatively or additionally, a recalibration process can be performed, such as described above.

If the state record identifies an antenna that meets the performance parameter threshold ("Yes"), at 1308 the identified antenna is caused to be active. Generally, this includes activating the antenna module 112 if the antenna module is not currently active, or maintaining the antenna module as active if its already active.

At 1310, it is determined whether the state record identifies an antenna that is below the performance parameter threshold. The connectivity module 108, for instance, determines whether the identified state record 804 identifies an antenna with a performance parameter below the threshold, such as an antenna that is indicated as having a poor estimated signal condition, and/or an antenna that is identified as being occluded. If the state record does not identify an antenna that is below the performance parameter threshold ("No"), the method proceeds to 1306 where the optimization process terminates.

If the state record identifies an antenna that is below the performance parameter threshold ("Yes"), at 1312 it is determined whether a current signal condition of the antenna meets a signal condition threshold. Generally, a signal condition threshold can be defined in various ways, such as a threshold signal strength, a threshold signal quality, and so forth. Accordingly, the connectivity module 108 can determine a current signal condition of the antenna module 112, (e.g., current signal strength, signal quality, and so forth) and compare the current signal condition to the signal condition threshold. If the current signal condition of the antenna meets the signal condition threshold ("Yes"), at 1314 the antenna is maintained in an active state. For instance, if the identified antenna module 112 is active, it is maintained in an active state. The method may then proceed to 1306 where the optimization process terminates.

If the current signal condition of the antenna does not meet the signal condition threshold ("No"), at 1316 the antenna is maintained in an inactive state. For instance, if the identified antenna module 112 is active, it is deactivated. The method may then proceed to 1306 where the optimization process terminates.

Thus, implementations of process based antenna configuration include ways for utilizing different usage states (e.g., device obstruction state) to make decisions regarding wireless connectivity.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 14:
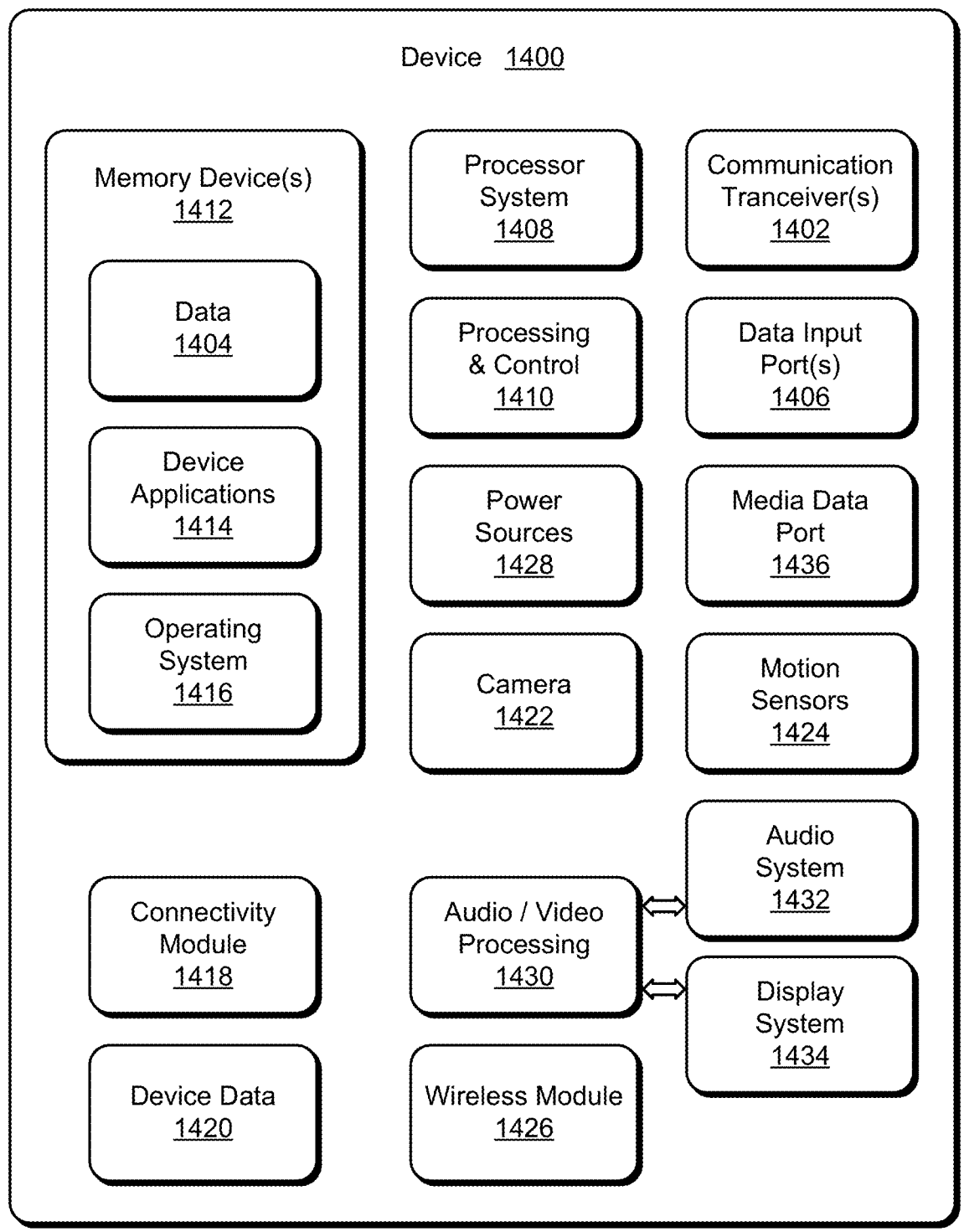
FIG. 14 illustrates various components of an example device that can implement aspects of process based antenna configuration.

FIG. 14 illustrates various components of an example device 1400 in which aspects of process based antenna configuration can be implemented. The example device 1400 can be implemented as any of the devices described with reference to the previous FIGS. 1-13, such as any type of wireless device, mobile phone, mobile device, wearable device, tablet, computing, communication, entertainment, gaming, media playback, and/or other type of electronic device. For example, the wireless device 102 as shown and described with reference to FIGS. 1-13 may be implemented as the example device 1400. In a wearable device implementation, the device may include any one or combination of a watch, armband, wristband, bracelet, glove or pair of gloves, glasses, jewelry items, clothing items, any type of footwear or headwear, and/or other types of wearables.

The device 1400 includes communication transceivers 1402 that enable wired and/or wireless communication of data 1404 with other devices. The data 1404 can include any of device identifying data, device location data, wireless connectivity data, and wireless protocol data. Additionally, the data 1404 can include any type of audio, video, and/or image data. Example communication transceivers 1402 include wireless personal area network (WPAN) radios compliant with various IEEE 1402.15 (Bluetooth™) standards, wireless local area network (WLAN) radios compliant with any of the various IEEE 1402.11 (Wi-Fi™) standards, wireless wide area network (WWAN) radios for cellular phone communication, wireless metropolitan area network (WMAN) radios compliant with various IEEE 1402.16 (WiMAX™) standards, and wired local area network (LAN) Ethernet transceivers for network data communication.

The device 1400 may also include one or more data input ports 1406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1400 includes a processing system 1408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1410. The device 1400 may further include any type of a system bus or other data and command transfer system that couples the various components within the device. A system bus can include any one or combination of different bus structures and architectures, as well as control and data lines.

The device 1400 also includes computer-readable storage memory 1412 (e.g., memory devices) that enable data storage, such as data storage devices that can be accessed by a computing device, and that provide persistent storage of data and executable instructions (e.g., software applications, programs, functions, and the like). Examples of the computer-readable storage memory 1412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1400 may also include a mass storage media device.

The computer-readable storage memory 1412 provides data storage mechanisms to store the data 1404, other types of information and/or data, and various device applications 1414 (e.g., software applications). For example, an operating system 1416 can be maintained as software instructions with a memory device and executed by the processing system 1408. The device applications may also include a device manager, such as any form of a control application, software application, signal-processing and control module, code that is native to a particular device, a hardware abstraction layer for a particular device, and so on. Computer-readable storage memory 1412 represents media and/or devices that enable persistent and/or non-transitory storage of information in contrast to mere signal transmission, carrier waves, or signals per se. Computer-readable storage memory 1412 do not include signals per se or transitory signals.

In this example, the device 1400 includes a connectivity module 1418 that implements aspects of process based antenna configuration, and may be implemented with hardware components and/or in software as one of the device applications 1414, such as when the device 1400 is implemented as the wireless device 102. An example, the connectivity module 1418 can be implemented as the connectivity module 108 described in detail above. In implementations, the connectivity module 1418 may include independent processing, memory, and logic components as a computing and/or electronic device integrated with the device 1400. The device 1400 also includes device data 1420 for implementing aspects of process based antenna configuration, and may include data from the connectivity module 108.

In this example, the example device 1400 also includes a camera 1422 and motion sensors 1424, such as may be implemented in an inertial measurement unit (IMU). The motion sensors 1424 can be implemented with various sensors, such as a gyroscope, an accelerometer, and/or other types of motion sensors to sense motion of the device. The various motion sensors 1424 may also be implemented as components of an inertial measurement unit in the device.

The device 1400 also includes a wireless module 1426, which is representative of functionality to perform various wireless communication tasks. For instance, for the wireless device 102, the wireless module 1426 can be leveraged to scan for and detect wireless networks, as well as negotiate wireless connectivity to wireless networks for the wireless device 102. The device 1400 can also include one or more power sources 1428, such as when the device is implemented as a wireless device. The power sources 1428 may include a charging and/or power system, and can be implemented as a flexible strip battery, a rechargeable battery, a charged super-capacitor, and/or any other type of active or passive power source. Generally, utilizing implementations of process based antenna configuration enables the power sources 1428 to be conserved as part of a wireless network connectivity process.

The device 1400 also includes an audio and/or video processing system 1430 that generates audio data for an audio system 1732 and/or generates display data for a display system 1434. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of process based antenna configuration have been described in language specific to features and/or methods, the subject of the appended claims is not necessarily limited to the specific features or methods described. Rather, the features and methods are disclosed as example implementations of process based antenna configuration, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: detecting a calibration event indicating that a wireless device is to be calibrated for wireless connectivity and based on a process that resides on the wireless device; initiating calibration based on the calibration event, the calibration including: identifying one or more obstruction states that each identify one or more regions of the wireless device that are occluded in a respective obstruction state; determining, for each of the one or more obstruction states, a performance parameter for each antenna of a set of antennas of the wireless device, each performance parameter being based on whether a respective antenna is at least partially occluded in a respective obstruction state; generating a state record identifying the process, one or more of the antennas, and respective performance parameters for the one or more of the antennas; and causing the state record to be available for configuring the set of antennas of the wireless device.

Alternatively or in addition to the above described method, any one or combination of: wherein the calibration event is triggered based on detecting one or more of that the process is launched or that the process is active on the wireless device; wherein the process comprises one or more of an application or a system process of the wireless device; wherein said identifying the one or more obstruction states is based on sensor data indicating one or more regions of the wireless device that are one or more of in contact with a user or in proximity to a user; wherein a performance parameter for a particular antenna for a particular obstruction state indicates an estimated signal condition for the antenna in the particular obstruction state; wherein a performance parameter for a particular antenna for a particular obstruction state indicates an estimated signal condition for the antenna in the particular obstruction state, and wherein the signal condition is estimated based on whether the particular antenna is at least partially occluded in the particular obstruction state; wherein said identifying the one or more obstruction states comprises identifying multiple obstruction states as part of the calibration, the method further comprising: generating, for each obstruction state, a confidence score indicating a confidence that the obstruction state is a primary interaction state for the process on the wireless device; wherein said generating a confidence score for each obstruction state is based on a respective time duration for each obstruction state; further comprising selecting a obstruction state with a highest confidence score, wherein said generating the state record comprises including, in the state record, performance parameters for the one or more of the antennas observed in conjunction with the obstruction state with the highest confidence score; wherein said generating the state record further comprises including a user identifier for a user associated with the wireless device.

A method comprising: detecting, based on a process that resides on a wireless device, an optimization event indicating that a set of antennas of the wireless device are to be optimized for wireless communication; accessing a state record that identifies the process and that specifies a performance parameter for each antenna; and configuring one or more of the antennas based on the performance parameter, including at least one of activating an antenna based on its respective performance parameter, or deactivating an antenna based on its respective performance parameter.

Alternatively or in addition to the above described method, any one or combination of: wherein said detecting the optimization event is based on an indication that the process is launched on the wireless device, the process comprising one or more of an application or a system process; wherein said accessing the state record comprises: searching a database of state records utilizing an identifier for the process; identifying the state record based on the state record including the identifier for the process; and selecting the state record based on a confidence score for the state record meeting a confidence threshold; wherein the state record indicates a poor estimated signal condition for a particular antenna, and wherein the method further comprises: measuring a current signal condition of the particular antenna; and determining whether to disable the particular antenna based on the current signal condition; further comprising: disabling the particular antenna if the current signal condition indicates a poor signal condition; or maintaining the particular antenna as active if the current signal condition indicates a good signal condition; wherein said configuring the one or more antennas is performed independent of a current observation of a signal condition of the one or more antennas; wherein the state record is generated based on a calibration process performed on a different device.

A wireless device comprising: a sensor system; a set of antennas; and a connectivity module implemented to: receive data from the sensor system describing an obstruction state that identifies one or more regions of the wireless device that are occluded while a particular process is active on the wireless device; determine for the obstruction state a performance parameter for each antenna of the set of antennas, each performance parameter being based on whether a respective antenna is at least partially occluded in the obstruction state; detecting a launch event indicating that the process is launched on the wireless device; and configuring, based on the launch event, one or more of the antennas based on a respective performance parameter for the one or more antennas.

Alternatively or in addition to the above described wireless device, any one or combination of: wherein the data from the sensor system identifies multiple obstruction states, and wherein the connectivity module is further implemented to: calculate a confidence score for each obstruction state, wherein each confidence score is indicative of a confidence that a respective obstruction state represents a primary interaction state for the particular process; and select the obstruction state based on its confidence score; wherein the data from the sensor system identifies multiple obstruction states, and wherein the connectivity module is further implemented to: calculate a confidence score for each obstruction state, wherein each confidence score is indicative of a confidence that a respective obstruction state represents a primary interaction state for the particular process; compare each confidence score to a confidence score threshold; and initiate recalibration of the wireless device based on each confidence score being below the confidence score threshold.

The invention claimed is:

1. A method comprising:
  detecting, based on a process that resides on a wireless device, an optimization event indicating that a set of antennas of the wireless device are to be optimized for wireless communication;
  accessing a state record that identifies the process and that specifies a performance parameter for each antenna, including:
    searching a database of state records utilizing an identifier for the process;
    identifying the state record based on the state record including the identifier for the process;
    selecting the state record based on a confidence score for the state record meeting a confidence threshold; and
  configuring one or more of the antennas based on the performance parameter, including at least one of activating an antenna based on its respective performance parameter, or deactivating an antenna based on its respective performance parameter.

2. The method as recited in claim 1, wherein said detecting the optimization event is based on an indication that the process is launched on the wireless device, the process comprising one or more of an application or a system process.

3. The method as recited in claim 1, wherein the state record indicates a poor estimated signal condition for a particular antenna, and wherein the method further comprises:
  measuring a current signal condition of the particular antenna; and
  determining whether to disable the particular antenna based on the current signal condition.

4. The method as recited in claim 3, further comprising:
  disabling the particular antenna if the current signal condition indicates a poor signal condition; or
  maintaining the particular antenna as active if the current signal condition indicates a good signal condition.

5. The method as recited in claim 1, wherein said configuring the one or more antennas is performed independent of a current observation of a signal condition of the one or more antennas.

6. The method as recited in claim 1, wherein the state record is generated based on a calibration process performed on a different device.

7. The method as recited in claim 1, further comprising generating the state record based on a calibration process that detects how a user holds the wireless device while interacting with the process.

8. A wireless device comprising:
a set of antennas; and
a connectivity module implemented to:
  detect, based on a process that resides on the wireless device, an optimization event indicating that the set of antennas of the wireless device are to be optimized for wireless communication;
  access a state record that identifies the process and that specifies a performance parameter for each antenna, including to:
    search a database of state records utilizing an identifier for the process; and
    select the state record based on the state record including the identifier for the process and based on a confidence score for the state record meeting a confidence threshold; and
  configure one or more of the antennas based on the performance parameter, including at least one of to activate an antenna based on its respective performance parameter, or deactivate an antenna based on its respective performance parameter.

9. The wireless device as recited in claim 8, wherein to detect the optimization event is based on an indication that the process is launched on the wireless device, the process comprising one or more of an application or a system process.

10. The wireless device as recited in claim 8, wherein the state record indicates a poor estimated signal condition for a particular antenna, and wherein the connectivity module is further implemented to:
  measure a current signal condition of the particular antenna; and
  determine whether to disable the particular antenna based on the current signal condition.

11. The wireless device as recited in claim 10, wherein the connectivity module is further implemented to:
  disable the particular antenna if the current signal condition indicates a poor signal condition; or
  maintain the particular antenna as active if the current signal condition indicates a good signal condition.

12. The wireless device as recited in claim 8, wherein to configure the one or more antennas is performed independent of a current observation of a signal condition of the one or more antennas.

13. The wireless device as recited in claim 8, wherein the state record is generated based on a calibration process performed on a different device.

14. The wireless device as recited in claim 8, wherein the connectivity module is further implemented to generate the state record based on a calibration process that detects how a user holds the wireless device while interacting with the process.

15. A system comprising:
one or more processors implemented at least in part in hardware;
one or more computer-readable storage media storing instructions that are executable by the one or more processors to:
  detect, based on a process that resides on a wireless device, an optimization event indicating that a set of antennas of the wireless device are to be optimized for wireless communication;
  access a state record that identifies the process and that specifies a performance parameter for each antenna, including to:
    search a database of state records utilizing an identifier for the process;
    select the state record based on the state record including the identifier for the process and based on a confidence score for the state record meeting a confidence threshold; and
  configure one or more of the antennas based on the performance parameter, including at least one of to activate an antenna based on its respective performance parameter, or deactivate an antenna based on its respective performance parameter.

16. The system as recited in claim 15, wherein to detect the optimization event is based on an indication that the process is launched on the wireless device, the process comprising one or more of an application or a system process.

17. The system as recited in claim 15, wherein the state record indicates a poor estimated signal condition for a particular antenna, and wherein the instructions are further executable by the one or more processors to:
  measure a current signal condition of the particular antenna; and
  determine whether to disable the particular antenna based on the current signal condition.

18. The system as recited in claim 17, wherein the instructions are further executable by the one or more processors to:
  disable the particular antenna if the current signal condition indicates a poor signal condition; or
  maintain the particular antenna as active if the current signal condition indicates a good signal condition.

19. The system as recited in claim 15, wherein to configure the one or more antennas is performed independent of a current observation of a signal condition of the one or more antennas.

20. The system as recited in claim 15, wherein the instructions are further executable by the one or more processors to generate the state record based on a calibration process that detects how a user holds the wireless device while interacting with the process.

* * * * *